March 31, 1959 J. P. WHELAN 2,879,882
CONVEYOR
Filed May 17, 1956 4 Sheets-Sheet 1

INVENTOR.
James P. Whelan
BY
J. Stanley Churchill
ATTORNEY

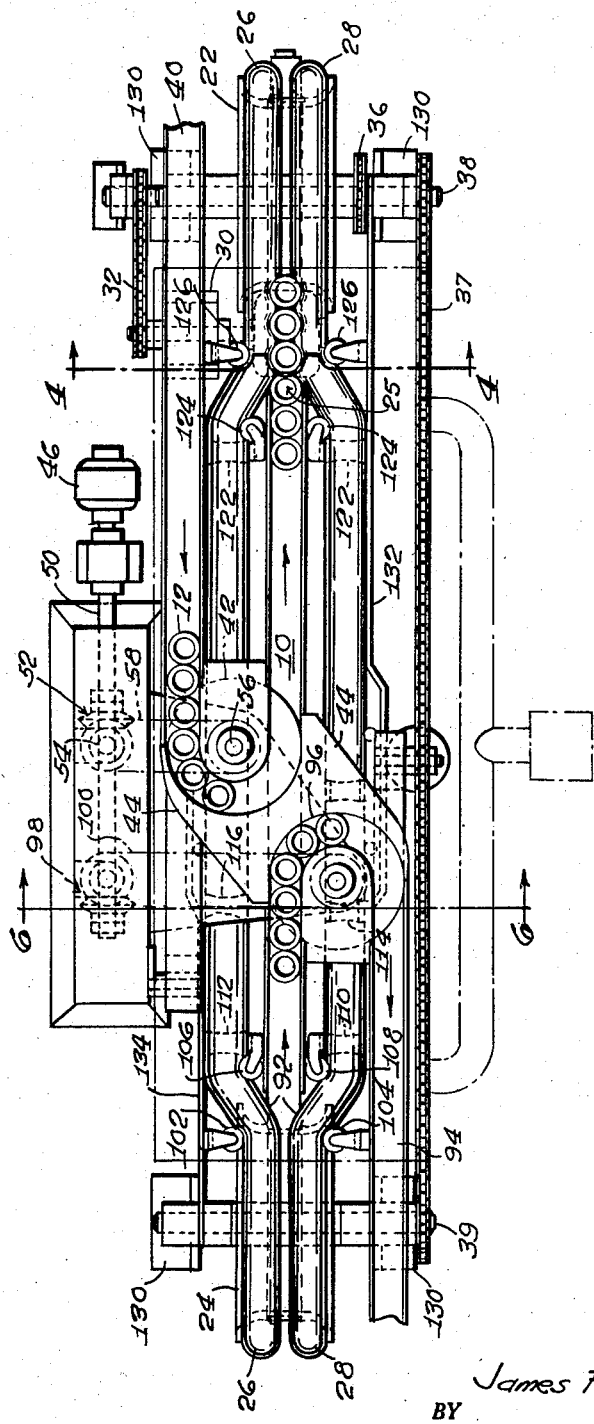

March 31, 1959   J. P. WHELAN   2,879,882
CONVEYOR
Filed May 17, 1956   4 Sheets-Sheet 3
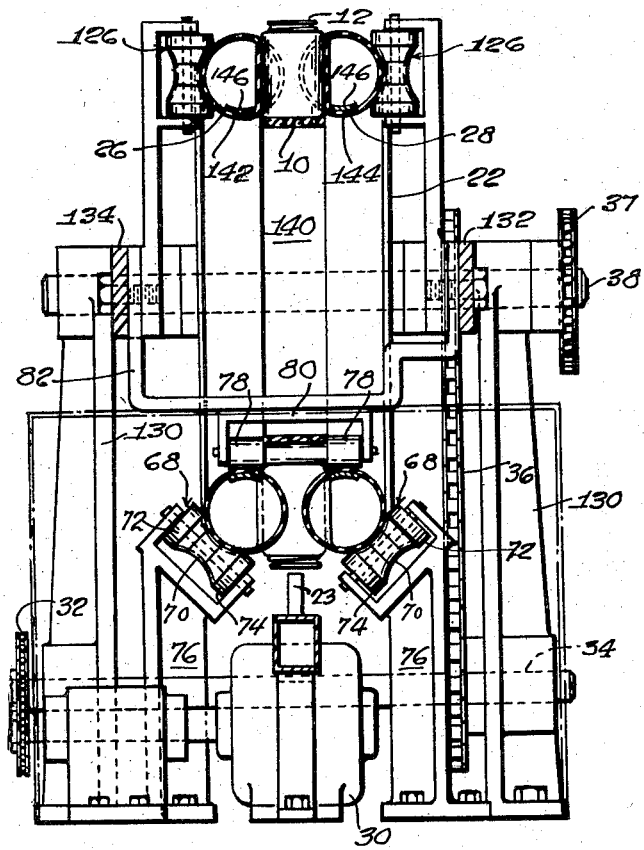
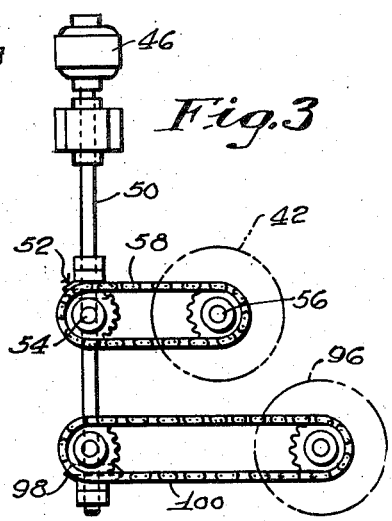
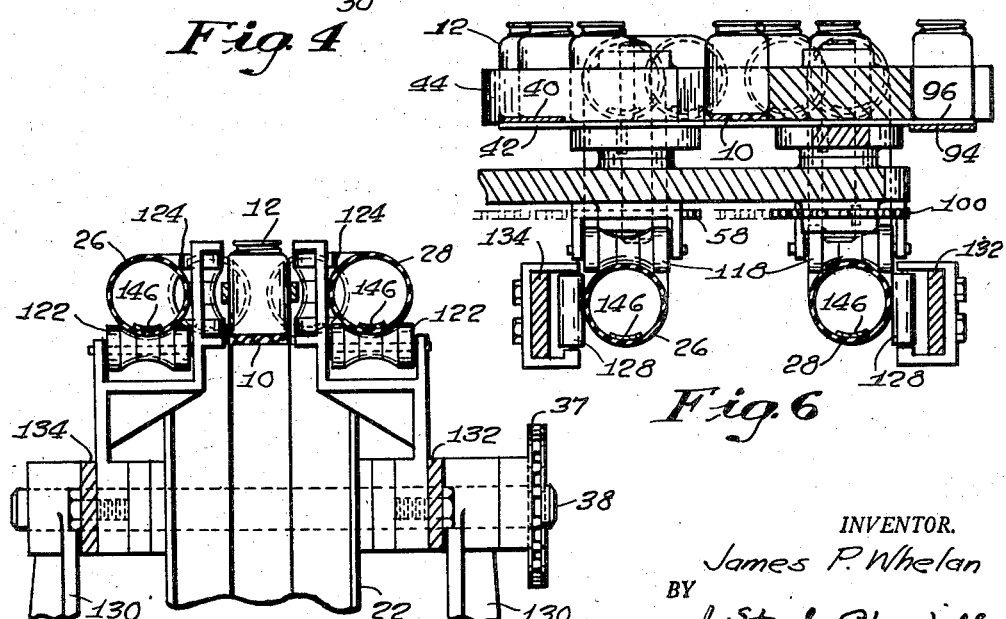
INVENTOR.
James P. Whelan
BY
J. Stanley Churchill
ATTORNEY

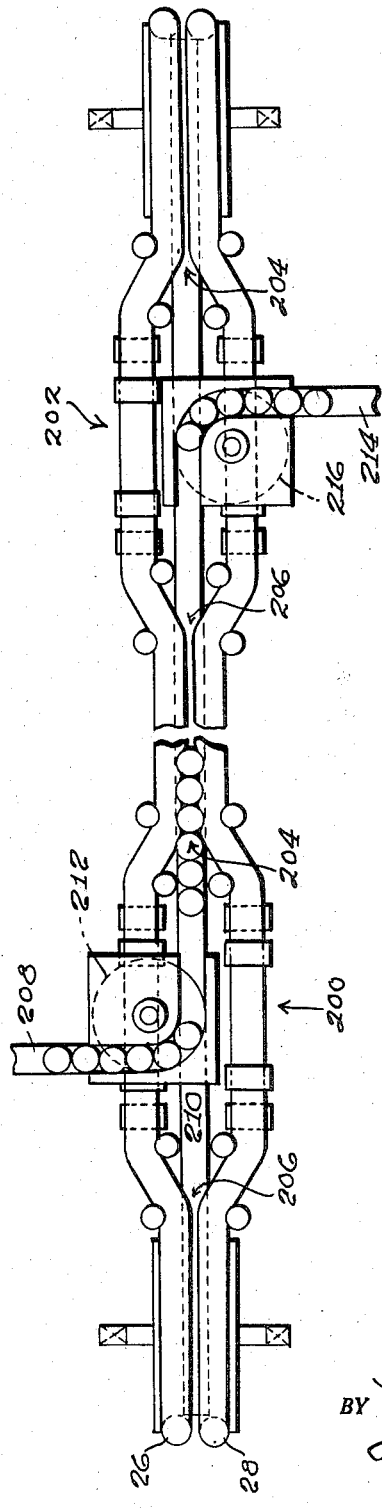

United States Patent Office 2,879,882
Patented Mar. 31, 1959

2,879,882

CONVEYOR

James P. Whelan, Quincy, Mass., assignor to Pneumatic Scale Corporation, Limited, Quincy, Mass., a corporation of Massachusetts Application May 17, 1956, Serial No. 585,480

12 Claims. (Cl. 198—33)

This invention relates to a conveyor.

The invention has for an object to provide a novel and improved conveyor adapted to convey articles, such as bottles and containers, in a novel manner such as to prevent injury or damage to the articles, which automatically conforms to articles of varying sizes and shapes, and with which the direction of the articles may be substantially changed during the conveyance of the articles, as for example an upright open mouthed container may be inverted for cleaning purposes.

With this general object in view and such others as may hereinafter appear, the invention consists in the conveying mechanisms hereinafter described and particularly defined in the claims at the end of this specification.

In the drawings illustrating the preferred embodiment of the invention:

Fig. 2 is a plan view of the same;

Fig. 3 is a plan view detail of driving mechanism to be referred to;

Fig. 4 is a cross sectional view taken on the line 4—4 of Fig. 2;

Fig. 5 is a cross sectional view taken on the line 5—5 of Fig. 1;

Fig. 6 is a cross sectional view taken on the line 6—6 of Fig. 2; and

Fig. 7 is a plan view illustrating a modified form of the present conveyor.

Figure 1:
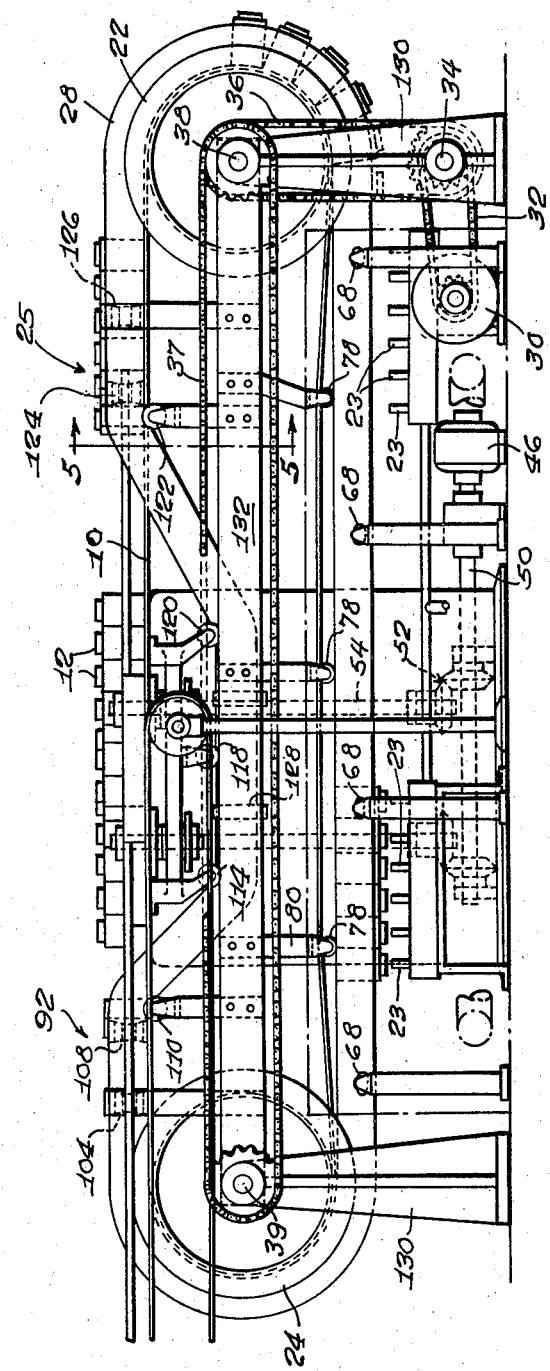
Fig. 1 is a side elevation of the present conveying mechanism.

In general the present invention contemplates a novel and improved conveying mechanism adapted to grip and continuously convey articles, such as containers, in a smooth and gentle manner such as to avoid scratching or marring of the outer surfaces of the containers and which is adapted to automatically conform to various shapes and sizes of containers.

In the preferred embodiment of the invention the conveyor automatically changes the direction of extension of the articles during conveyance thereof, as for example from an upright to an inverted position.

In general in the illustrated embodiment of the invention the conveying mechanism comprises a conveyor including a pair of endless inflated tubes mounted to run side by side, preferably in slightly spaced relation through two endless paths, and with at least one end portion of each path being curved. The endless paths may also include two spaced curved intermediate portions and two generally linear intermediate portions. The articles are preferably moved into position to be gripped between the tubes on an intermediate separate conveyor belt. Provision is made in the illustrated embodiment of the invention for diverting the tubes laterally outwardly along the linear intermediate portion of the upper run thereof to form a converging portion at one end of the intermediate portion for the reception of the articles and to form a diverging portion at the other end of said portion at which the containers may be released. Provision is also made for transferring containers from a supply thereof onto the intermediate supporting belt and for transferring the released containers therefrom onto a discharge conveyor, and in order to permit lateral transfer of the containers to and from the intermediate supporting belt provision is also made for diverting the tubes downwardly out of the plane of transfer to and from the intermediate belt.

Referring now to the drawings, the conveying mechanism is herein illustrated as embodied in a container cleaning machine and comprises in general a continuously moving central or intermediate supporting belt 10 to which containers 12 are delivered from a supply conveyor 40 by rotary transfer means indicated generally at 42. In operation the containers 12 are moved along the supporting belt 10 into the converging portion 25 of a pair of endless inflated tubes 26, 28 arranged to resiliently grip and convey the containers therebetween. As herein shown, the endless inflated tubes 26, 28 are guided in slightly spaced relation over end pulleys 22, 24 providing an upper run and a lower run, and in operation the containers gripped between the inflated tubes along the upper run in an upright position are carried around the pulley 22 to assume an inverted position along the lower run of the conveying mechanism. While being conveyed in an inverted position the containers may be subjected to cleaning, washing or other operations which may be conveniently performed while the containers are inverted by any usual or preferred form of mechanism, such as the nozzles 23 mounted to direct a stream of air upwardly into the inverted open mouth containers as the latter are being conveyed in the lower run of the conveyor as shown. Thereafter the containers are carried around the end pulley 24 and back onto the upper run where they are released at a diverging portion 92 of the inflated tubes 26, 28 onto the central belt 10. The containers may then be guided onto rotary transfer means indicated at 96 to transfer the containers onto a discharge conveyor 94. As herein shown, suitable guide rolls are provided for guiding the inflated tubes both laterally outwardly and vertically downwardly along the upper run of the conveyor whereby to provide the converging and diverging portions 25, 92 and also to divert the tubes out of the path of the containers being transferred to and from the intermediate supporting belt 10 as will hereinafter be more fully described. As illustrated in Figs 1 and 2, the pulleys 22, 24 may be driven through drive mechanism comprising an electric motor 30 which may be connected by a chain and sprocket drive 32 to an intermediate shaft 34. The intermediate shaft 34 is connected by a chain and sprocket drive 36 to the pulley shaft 38 on which the pulley 22 is mounted. A chain and sprocket drive connection 37 may be provided between the pulley shafts 38, 39 as shown.

Provision is made for transferring containers from a supply thereof onto the central conveyor 10, and as herein shown, a supply of containers may be fed into the machine on a supply conveyor 40 which may be continuously driven in any usual or preferred manner (not shown). The containers are advanced by the conveyor 40 onto a rotary transfer disk or turntable 42 and into engagement with a guide plate 44 arranged to guide and transfer the containers onto the central conveyor 10 as illustrated in Fig. 2. The transfer disk 42 may be independently driven through driving mechanism which includes an electric motor 46 operatively connected to a shaft 50 which is connected by bevel gears 52 to a vertical shaft 54 which in turn is connected to the transfer disk shaft 56 by a chain and sprocket drive 58 as best shown in Fig. 3.

The containers 12 are fed into the machine in an upright position and are advanced on the supporting belt 10 along a laterally spaced portion of the conveyor, and as they enter the converging portion 25 of the opposed inflated tubes 26, 28 they are firmly and resiliently gripped therebetween and carried from the upper run of the conveyor around the pulley 22 and into the lower run of the conveyor to assume an inverted position along the lower run. As is obvious in Fig. 1, the curved end portions of the endless paths around the pulleys 22, 24 are in the shape of an arc of about 180°.

As shown in Fig. 4, the inflated tubes 26, 28 are arranged to be supported along the lower run of the conveyor in firm gripping engagement with the containers 12, and as herein shown, the tubes may be supported by spool shaped idler guide rollers 68 having a concave surface to fit around portions of the convex surfaces of the cylindrical tubes. In order to prevent undue friction between the different diameters of the concave portions of the spool the guide rollers 68 may be formed in separate sections comprising an intermediate section 70 and outer end sections 72, 74 so that each section may rotate independently and thus prevent friction which might otherwise occur due to the variation in surface speeds at the different points of contact with the tubes 26, 28. The guide rollers 68, as shown in Fig. 4, are preferably supported at an angle of about 45° with respect to the outer lower quadrant of the tubes in a manner such as to urge the tubes upwardly and inwardly in gripping engagement with the containers carried therebetween. The rollers 68 may be supported in upright brackets 76 mounted on the base of the machine. In order to further control the path of travel of the tubes 26, 28 along the lower run to cause them to be maintained in firm engagement with the inverted containers 12 and to prevent upward displacement thereof a series of idler rollers 78 are supported for engagement with the upper portions of the tubes as clearly shown in Fig. 4. The rollers 78 may be supported in brackets 80 depending from a bracket 82 forming a part of the machine frame.

After passing through the lower run of the conveyor in an inverted position the containers 12 are again carried into the upper run around the end pulley 24 and are released from gripping engagement with the tubes 26, 28 at a diverging portion of the conveyor, as indicated at 92, and the cleaned containers may then be transferred from the central belt 10 onto a discharge conveyor 94 by a rotary transfer disk 96 disposed between the conveyors, as shown, and by engagement with the guide plate 44 in a manner similar to the transfer of the containers from the supply conveyor 40 onto the central belt 10. The rotary transfer disk 96 may be driven in a manner similar to the supply transfer disk 42 through connections from the shaft 50, bevel gears 98 and chain and sprocket drive 100 as shown in detail in Fig. 3.

As shown in Figs 1 and 2, provision is made for diverting the inflated tubes 26, 28 laterally outwardly in a generally horizontal common plane along the intermediate portion of the upper run to provide lateral offset portions in said common plane forming the converging and diverging portions 25 and 92 so that the containers received on the central conveyor 10 are free of contact with the tubes 26, 28, and provision is also made for diverting the tubes vertically downwardly out of the plane of transfer of the containers to and from the central belt 10 whereby to permit lateral transfer of the containers to and from the central belt 10 without interference from the tubes. As illustrated in Fig. 2, idler rollers 102, 104 are supported in spaced relation for engaging the outer surfaces of opposed tubes adjacent the discharge end of the conveyor along the upper run, and idler rolls 106, 108 are supported in spaced relation for engagement with the inner surfaces of the tubes to provide the diverging portion 92 at one end of the conveyor. As shown in Figs. 1 and 2, idler rolls 110, 112 are also provided for engaging the underside of the tubes along the upper run adjacent the discharge end of the conveyor which cooperate with another set of idler rolls 114, 116 spaced therefrom and disposed at a lower plane for engaging the upper surfaces of the tubes to divert the tubes downwardly as described. One or more intermediate idler pulleys 118 may also be provided for maintaining the tubes in their lower diverted position. Idler rolls 120, 122 engageable with the upper and lower surfaces respectively cooperate to guide the tubes upwardly into the normal plane of the upper run as illustrated in Fig. 1. Idler rolls 124 engageable with the inner surfaces of the tubes are arranged to cooperate with idler rolls 126 engageable with the outer surfaces of the tubes to provide the converging portions 25 at the other end comprising the receiving end of the conveyor as illustrated in Fig. 2. Vertically disposed auxiliary rollers 128 may also be provided for engagement with the outer sides of the tubes to prevent lateral displacement outwardly thereof during their passage through the diverted portion of the upper run as shown.

As shown in Figs. 1 and 2, the pulley shafts 38, 39 may be journaled in upright brackets 130 supported from the base of the machine, the brackets being provided with connecting side rails 132, 134 to which the various roller supporting brackets may be attached. It will be observed that the central supporting belt 10 is preferably guided upwardly over the rollers 78 along the lower run of the conveyor out of engagement with the bottoms of the inverted containers as shown.

As illustrated in Fig. 4, each pulley 22, 24 is provided with an intermediate or central portion 140 having a flat cylindrical surface for accommodating the intermediate or central flat belt 10 on which the containers are supported and advanced into and out of engagement with the inflated tubes 26, 28. Each pulley is further provided with concave cylindrical portions 142, 144 on each side of and slightly above the flat surface 140 which is adapted to conform to the shape of the cylindrical tubes 26, 28. It will be observed that the concave portions 142, 144 are formed to correspond substantially to the outer surfaces defined by the outer lower quadrant of each cylindrical tube in the upper run, the concave portions preferably being extended slightly beyond each end of the lines defining the quadrant, so that the lower portion of each quadrant provides a base for frictional driving engagement with the inner run of its tube, and the outer portions of each quadrant tend to urge the tubes inwardly into firm engagement with the containers or other articles carried therebetween.

In order to prevent twisting of the tubes 26, 28 relative to the pulleys 22, 24 during their passage through the machine the interior surface of each cylindrical rubber tube may be provided with a relatively narrow endless band 146 of fabric or like material secured to the inner surface along the inner run of the tube for engagement with the base portion of the concave portions 142, 144 of the pulleys so that in passing around the pulleys the band portions 146 will follow the base portions of the quadrants and thus prevent lateral or rotary movement of the tubes relative to the pulleys. It will be understood that the bands 146 may comprise a relatively nonstretchable fabric or like material so that the inner runs of the tubes will tend to follow the base portions of the pulleys, as described, to maintain the tubes in a straight run relative to the pulleys. In effect the bands 146 act as narrow belts disposed within the tubes. It will be observed that the spacing of the concave portions of the pulleys is such as to dispose the inflated tubes in a normal slightly spaced relation, as illustrated in Fig. 4, for efficient resilient gripping engagement with average size containers.

In operation the tubes may be inflated at a relatively low pressure, approximately one and one-half pounds pressure for example, providing ample resiliency for gripping engagement with the sides of the containers. While the normal pressure of one and one-half pounds is capable of accommodating a wide range of sizes, in practice the tubes may be inflated to a slightly greater pressure to accommodate very small containers, or the tubes may be deflated to a slightly lower pressure to accommodate relatively large size containers.

In operation it will be seen that the containers on the belt 10 in the upper run of the conveyor are supported relative to the tubes 26, 28 so that the tubes will firmly engage the sides of the containers fed therebetween and will carry the same downwardly around the pulley 22 with the bottoms of the containers in engagement with the belt 10, and when the containers reach the lower run in an inverted position the belt 10 is guided out of engagement with the bottoms of the containers so that the containers are engaged solely by the tubes during their travel through the lower run. The cleaning operation may be performed by any usual or preferred air cleaning apparatus as above set forth, and after the cleaning operation the containers being carried from the lower run around the pulley 22 again engage the central supporting belt 10, and when they reach the upper run the containers are released by the tubes at the diverging portion 92 of the conveyor to be again supported by the central conveyor.

From the description thus far it will be observed that the present conveyor provides a simple and economical means of conveying containers or other articles and for converting them from an upright position to an inverted position to facilitate cleaning or other operations which may be conveniently performed on containers as they are conveyed in an inverted position. It will also be observed that containers of various sizes and shapes may be firmly and resiliently gripped between the inflated tubes, the resiliency of the tubes causing them to conform to the shape and size of the containers or other articles gripped therebetween. It will also be apparent that the resilient gripping engagement of the tubes prevents scratching or marring of the outer surfaces of the containers so that they may be smoothly and gently conveyed at a relatively rapid rate and in a continuous and positive manner.

In operation it will be apparent that the rate of speed of travel of the containers is limited only by the efficiency in the performance of the cleaning or other mechanism arranged to operate upon the containers in the lower run at a particular rate of speed of the containers. It will also be seen that a greater number of small containers arranged in contiguous engagement will pass the operating mechanism at a particular rate of speed than the number of large containers in contiguous engagement passing at the same speed. Thus, in practice the speed of the machine may be adjusted accordingly so as to obtain efficient operating performance at the highest practical speed. In operation good results have been obtained at varying speeds with different sizes of containers, from a low of 200 containers per minute to a high of 1000 containers per minute. While the containers are shown herein as being moved along in contiguous engagement it will be apparent that any suitable spaced feed mechanism may be employed to arrange the containers in predetermined spaced relation for passage through the machine if desired. While the intermediate supporting belt 10 is herein shown as comprising a flat fabric or like belt, in a modified form of the invention the belt 10 may be replaced by a flat metal link type belt of known structure which runs over sprockets and which may also form the driving connection between the two pulleys 22, 24 so that the chain and sprocekt drive connection 37 may be omitted.

In a modified form of the present conveyor, which enables operations to be performed on the articles being conveyed without requiring inversion, and as illustrated diagrammatically in Fig. 7, all the conveying may be performed in the upper run of the conveyor. As herein illustrated, in the modified form of the invention the opposed inflated tubes 26, 28 may be diverted along the upper run of the conveyor by suitable guide rollers in a manner such as to provide two laterally outward diverted portions 200, 202. Each laterally diverted or spaced apart portion 200, 202 is provided with a converging portion 204 and a diverging portion 206. Each laterally diverted portion 200, 202 may also be guided vertically downward to permit lateral transfer of containers or other articles from an intake conveyor 208 to an intermediate supporting belt 210 by the rotary transfer disk 212 at one end of the conveyor and to permit lateral transfer of the containers from the belt 210 onto a discharge conveyor 214 by the rotary transfer disk 216 at the other end of the conveyor. In operation the containers or other articles advanced on the intermediate supporting belt 210 at one end of the conveyor will be fed into the converging portion 204 of the first laterally spaced apart portion 200 to be gripped and conveyed therebetween. During such conveyance the containers may be subjected to operations which may be conveniently performed thereon with the containers being conveyed in an upright position along the upper run of the conveyor. Thereafter the containers may be released at the diverging portion 206 of the second laterally spaced apart portion 202 of the conveyor to be transferred by the rotary disk 216 onto the discharge conveyor 214. The opposed inflated tubes 26, 28, herein shown as being diverted vertically downward to permit lateral transfer of containers to the intermediate belt, may instead be diverted vertically upward in a similar manner to dispose the tubes out of the path of transfer of the containers to and from the intermediate belt.

From the above description it will be observed that the present novel structure of conveying mechanism permits conveyance of containers at a relatively rapid rate in a smooth and gentle manner so as to prevent scratching or marring of the outer surfaces thereof and wherein the resiliency of the low pressure inflated tubes permits conveyance of a relatively large range of different sizes of containers or other articles without adjustment of the spacing of the tubes, those below and above such range being accommodated by merely inflating or deflating the tubes slightly to take care of very small and very large containers respectively. It will also be observed that the present conveyor having an upper and a lower run provides a simple and convenient manner for inverting containers and for conveying the containers in an inverted position whereby cleaning or other operations may be conveniently performed along the lower run.

While it is preferred to utilize inflated tubes in the present conveyor, as above described, it will be understood that other forms of resilient conveying members may be used.

While the preferred embodiment of the invention has been herein illustrated and described, it will be understood that the invention may be embodied in other forms within the scope of the following claims.

Having thus described the invention, what is claimed is:

1. A conveyor comprising a pair of endless inflated resilient tubular members, means for moving said inflated tubular members through two endless paths, at least one end portion of each path being curved and said inflated members being closely spaced during movement through one of said curved portions of the endless path to enable articles to be gripped by and conveyed between said inflated members as the latter move through such curved portions of said paths, said curved portions of said curved paths being of a shape such as to cause the direction of extension of the articles to be substantially changed as the articles are thus gripped and conveyed, each of said endless paths including two spaced curved intermediate portions and two generally linear intermediate portions.

2. A conveyor as defined in claim 1 wherein provision is made for spreading apart linear portions of said endless members prior to their movement through said curved portions of the endless path, and for introducing articles between the thus spread members.

3. A conveyor as defined in claim 1 wherein provision is made for spreading apart linear portions of said endless members prior to and after their movement through said curved portions of the endless paths, and means for introducing articles between said thus spread members prior to their movement through said curved portions of the endless paths, and means for removing said articles from between said resilient members after they have passed through said curved paths.

4. Conveying mechanism as defined in claim 1 wherein the inflated resilient tubular members run over grooved end pulleys, each of said tubular members having an endless narrow band of relatively non-stretchable material secured to the inner wall thereof for cooperation with said grooved end pulleys whereby to prevent rotary twisting of the tubes relative to the grooves and to prevent excessive elongation of said resilient tubular members.

5. A conveyor comprising a pair of endless resilient members, means for moving said members through two endless paths, at least one end portion of each path being curved and said members being closely spaced during movement through said curved end portion of the endless paths to enable articles to be gripped and conveyed between said members as the latter move through said curved paths, said curved paths being parallel and of a shape such as to cause the direction of extension of the articles to be substantially changed as the articles are thus conveyed, each of said endless paths including two spaced curved intermediate portions and a generally linear intermediate portion, means for spreading apart said linear portions of said endless members prior to their movement through said curved end portions of the endless path, and means for introducing articles between the thus spread members.

6. A conveyor comprising a pair of endless resilient members, means for moving said members through two endless paths, at least one end portion of each path being curved and said members being closely spaced during movement through said curved end portion of the endless paths to enable articles to be gripped and conveyed between said members as the latter move through said curved paths, said curved paths being parallel and of a shape such as to cause the direction of extension of the articles to be substantially changed as the articles are thus conveyed, each of said endless paths including two spaced curved intermediate portions and two generally linear intermediate portions, means for spreading apart linear portions of said endless members prior to and after their movement through said curved end portions of the endless paths, means for introducing articles between said thus spread members prior to their movement through said curved end portions of the endless paths, and means for removing said articles from between said members after they have passed through said curved paths.

7. A conveyor comprising a pair of endless resilient members, two spaced pulley members rotatable about horizontal and parallel axes and around which said pair of endless resilient members run in closely spaced relation during their entire traverse around said pulley members and from one pulley member to the second pulley member providing upper and lower generally linear intermediate runs, means for introducing articles to between said endless resilient members in an upright position in one portion of the upper run thereof and prior to passage around one of the pulley members, and means for removing the articles from another portion of the upper run after passage around the second pulley member.

8. A conveyor comprising a pair of endless resilient members, means for moving said members through two endless paths, at least one end portion of each path being curved and said members being closely spaced during movement through said curved end portion of the endless paths to enable articles to be gripped and conveyed between said members as the latter move through said curved paths, said curved paths being parallel and of a shape such as to cause the direction of extension of the articles to be substantially changed as the articles are thus conveyed, each of said endless paths including two spaced curved intermediate portions and two generally linear intermediate portions, means for spreading linear intermediate portions of said endless members, and separate means for conveying articles into operative relation to said members and to between said spread apart members.

9. A conveyor comprising a pair of endless resilient members, means for moving said members through two endless paths, at least one end portion of each path being curved and said members being closely spaced during movement through said curved end portion of the endless paths to enable articles to be gripped and conveyed between said members as the latter move through said curved paths, said curved paths being parallel and of a shape such as to cause the direction of extension of the articles to be substantially changed as the articles are thus conveyed, each of said endless paths including two spaced curved intermediate portions and two generally linear intermediate portions, means for spreading apart linear intermediate portions of said endless members at two spaced points, and means for respectively conveying articles to and removing articles from between said members at said two points.

10. A conveyor as defined in claim 9 wherein said members are guided into positions at said two points out of alignment with said separate conveying means.

11. A conveyor comprising a pair of endless resilient tubular members, means for moving said resilient tubular members through two endless paths, each of said endless paths including two spaced curved end portions and two generally linear intermediate portions, at least one linear intermediate portion of at least one endless path being offset relative to a corresponding linear portion of the other endless path to enable articles to be introduced between and removed from between said endless members, said inflated members being closely spaced during movement through at least one of said curved end portions of the endless path to enable articles to be gripped by and conveyed between said inflated members as the latter move through such curved path, said curved end portion of said paths being in the shape of an arc of about 180° such as to cause the direction of extension of the articles to be substantially changed as the articles are thus conveyed.

12. A conveyor comprising a pair of endless inflated resilient tubular members, means for moving said inflated tubular members through two endless paths, each of said endless paths including two spaced curved end portions and a linear intermediate portion between said curved end portions with said intermediate portions disposed in a common generally horizontal plane, means producing a lateral offset in at least one of said intermediate portions with said offset extending in a direction away from the other intermediate portion but lying in said common plane, said inflated members having portions that are closely spaced during movement through at least one of said curved end portions of the endless paths to enable articles to be gripped by and conveyed between said inflated members as the latter move through said curved end portions, said one curved end portion of said paths being of a shape such as to cause the direction of extension of the articles to be substantially changed as the articles are thus conveyed.

References Cited in the file of this patent
UNITED STATES PATENTS

| | | |
|---|---|---|
| 1,568,594 | Flint | Jan. 5, 1926 |
| 2,593,627 | Stover | Apr. 22, 1952 |
| 2,764,274 | Griswold | Sept. 25, 1956 |

FOREIGN PATENTS

| | | |
|---|---|---|
| 1,004,522 | France | Mar. 31, 1952 |